Patented July 2, 1946

2,403,329

UNITED STATES PATENT OFFICE 2,403,329

1-SUBSTITUTED-2,5-DIKETO-7-METHYL-PYRIMIDOPYRAZOLES AS COUPLERS FOR COLOR PHOTOGRAPHY

Abraham Bavley, Binghamton, N. Y., assignor to General Aniline & Film Corporation, New York, N. Y., a corporation of Delaware No Drawing. Application December 5, 1944, Serial No. 566,770

12 Claims. (Cl. 95—6)

This invention relates to the production of colored photographic images by color development and more particularly to 1-substituted-2,5-diketo-7-methyl-pyrimidopyrazoles as new color-forming coupler compounds therefor.

It is known in three-color photography that the key image is the blue or blue-green image which is produced in the red-sensitive layer. It has been the practice in the art to produce such images, particularly in color-forming development methods, by the utilization of a phenol. On the other hand, it has been the practice to produce the magenta image by employing compounds which contain a reactive methylene group, usually a pyrazolone. I have now discovered that the reaction products of diketene with a pyrazolone which contains a primary amino group on the carbon atom in 3-position and a substituent on the nitrogen atom in 1-position give blue images on color-forming development despite the fact that such compounds still contain a reactive methylene group and are free from phenolic hydroxyl groups.

This result is surprising, for it was to be expected that the compounds, due to the presence of the reactive methylene group, would react in color-forming development in the same manner as the pyrazolones to produce magenta or purple images.

The compounds which are produced by this reaction are 1-substituted-2,5-diketo-7-methylpyrimidopyrazoles. The reaction leading to the formation of these compounds cannot take place by using any amino pyrazolone. On the contrary, it has been ascertained that unless the nitrogen atom in the 1-position be substituted and the primary amino group be in the 3-position, it is impossible to obtain the desired pyrimidopyrazoles. The use of pyrazolones having the aforestated structure is therefore critical to the successful production of the blue color-formers of the present invention.

It is an object of the present invention to provide a new class of color-formers for producing blue images by color-forming development.

A further object is to provide photographic emulsions and developer solutions which contain a new class of color-formers for producing blue images in situ with photographic images.

A still further object is to provide finished photographs which contain stable dye images.

Other objects will be apparent by reference to the following specification in which its preferred details and embodiments are described.

The above and other objects are accomplished according to the present invention by the use of 1-substituted-2,5-diketo-7-methyl-pyrimidopyrazoles of the general formula:

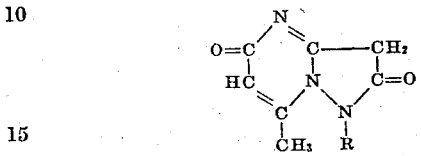

wherein R is an alkyl, e. g., methyl, ethyl, propyl, butyl, octyl, decyl, octadecyl, or any other alkyl radical containing up to 24 carbon atoms, aryl, e. g., phenyl, naphthyl, anthranyl, diphenyl, and the like, aralkyl, e. g., benzyl, methyl benzyl, ethyl benzyl, and the like, heterocyclic nucleus, e. g., benzothiazolyl, α-quinolyl, α-pyridyl and the like. Said alkyl, aryl, aralkyl and heterocyclic groups may be substituted by a halogen such as chlorine, bromine, or iodine, amino groups, e. g., primary amino, secondary amino, such as methyl amine, phenyl amine and the like, or a tertiary amine such as dimethyl amine, diphenyl amine, etc., sulfoamino or solubilizing groups such as sulfonic or carboxylic acid groups.

According to the present invention, these compounds are prepared by heating one mol of a 3-amino-5-pyrazolone, the 1-position of which is substituted by a radical represented by R above, with 1 to 1½ mols of diketene in the presence of a solvent-diluent, such as, for example, aromatic hydrocarbon, or an oxygenated hydrocarbon at a temperature ranging from 80° C. to 130° C., from 2 hours to 5 hours. Instead of employing a solvent-diluent for the reaction, the reactants may be suspended in water and the aqueous suspension heated at a temperature ranging from 80° C. to 100° C. for the same period of time.

As examples of suitable 1-substituted-3-amino-5-pyrazolones which condense with diketene according to this invention may be mentioned 1-methyl-3-amino-5-pyrazolone, 1-phenyl-3-amino-5-pyrazolone, 1-(2'-benzothiazolyl)-3-amino-5-pyrazolone, 1-(α-quinolyl)-3-amino-5-pyrazolone, 1-(α-pyridyl)-3-amino-5-pyrazolone, 1-β-naphthyl-3-amino-5-pyrazolone, 1-p-tolyl-3-amino-5-pyrazolone, 1-p-chlor-phenyl-3-amino-5-pyrazolone and the like.

Various structural formulae for diketene have been proposed in the literature (Ind. and Eng. Chem., 32, p. 16, 1940). Among the structures proposed are the following:

(1) 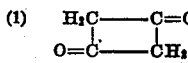   (2) 

(3) 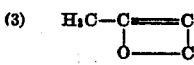   (4) 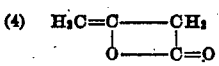

During the experimentation with and the practicing of this invention, I have discovered that the probable structure of diketene is immaterial since the commercially available diketene will condense with a 1-substituted-3-amino-5-pyrazolone to give a product characterized by a structure corresponding to the above general formula.

The 1-substituted-3-amino-5-pyrazolones employed as starting materials may be prepared in various ways. One suitable method which is described by Conrad and Zart in Ber., 39, 2282 (1906) consists of treating ethyl cyanoacetate with phenyl hydrazine, using sodium alcoholate as a condensing agent. Other suitable methods are described in the Jour. of Amer. Chem. Soc., 64, p. 2133, 1942, and United States Patent 2,343,704.

The condensation between the 1-substituted-3-amino-5-pyrazolone and diketene to produce the compounds of the present invention is carried out first, by dissolving the co-reactants in a suitable solvent-diluent such as a cyclic hydrocarbon, for example, cyclohexane, cycloheptane, cyclooctane, benzene, toluene, o, m, and p-xylene, ethylbenzene, 1,2,4-trimethylbenzene, propylbenzene, 1,3-ethylmethylbenzene, an oxygenated hydrocarbon such as, ethyl methyl ketone, diethyl ketone, methyl propyl ketone, allylacetone, mesityl oxide, dioxane and the like, stirring the reaction mixture at room temperature for a period of time ranging from 15 minutes to 1 hour. The reaction mixture is then heated on a steam bath at a temperature ranging from 75° C. to 130° C. for a period of time ranging from 2 hours to 5 hours. The reaction mixture is then cooled, the precipitated product washed with ether and recrystallized from methyl or ethyl alcohol. The ratio of the reactants is one mol of 1-substituted-3-amino-pyrazolone to 1 to 1½ mols of diketene. The desirable ratio of diketene, however, is in the range of 1.2 mols per one mol of 1-substituted-3-amino-pyrazolone.

Of these various classes of solvent-diluents, the aromatic hydrocarbons are by far the most practical, and therefore preferred in view of their relative cheapness. It is to be noted, however, that solvent-diluents other than above mentioned may also be employed, the selection depending more or less on the resistance of the selected solvent-diluent to react with diketene.

Specific compounds which have been prepared by the reactions hereinafter described are the following, it being understood that they are exemplary only and that they may contain other substituent groups as well as those included in these compounds.

1 - methyl-2,5-diketo-7-methyl-pyrimidopyrazole
1-ethyl-2,5-diketo-7-methyl-pyrimidopyrazole
1 - propyl-2,5-diketo-7-methyl - pyrimidopyrazole
1 - phenyl-2,5-diketo-7-methyl-pyrimidopyrazole
1-p-tolyl-2,5-diketo-7-methyl - pyrimidopyrazole
1-o-tolyl-2,5-diketo-7-methyl - pyrimidopyrazole
1 - (2' - benzothiazolyl) -2,5-diketo-7-methyl-pyrimidopyrazole
1-(α-quinolyl) -2,5-diketo-7-methyl-pyrimidopyrazole
1-(α-pyridyl) -2,5-diketo-7-methyl - pyrimidopyrazole In general, the compounds of the present invention are water insoluble. Their solubility in water, however, is accomplished by the introduction of suitable solubilizing groups, e. g., sulfonic or carboxylic acid groups into the groups represented by R in the above general formula.

The compounds of the present invention when employed as color-formers may be added to the developer, provided they are not fast to diffusion in gelatin, or to the silver-halide emulsion in the form of a solution or a suspension in a suitable solvent, such as, 1 N-alcoholic sodium or potassium hydroxide, acetone, ethyl alcohol, isopropyl alcohol, etc. Dispersing agents such as isopropyl naphthalene sulfonic acid or any of the dispersing agents disclosed in United States Patent 2,186,717 may be used in preparing the suspension of the water insoluble color-formers for incorporation into developers or silver-halide emulsions. Instead of gelatin, the color-formers may be incorporated in other colloidal materials such as, organic esters of cellulose, superpolyamides, polyesters or synthetic resins. The emulsion may be carried by a transparent medium such as cellulose esters, superpolyamides, synthetic resins or a non-transparent reflecting medium such as paper, or an opaque cellulose ester. The emulsion may be coated as a single layer on the support, or superposed layers containing the couplers may be coated on one or both sides of the support. The superposed layers may be differentially sensitized for the formation of a color image in the well-known manner.

When incorporating the color-formers into photographic silver-halide emulsions, it is essential that the substituent of the R group in the above general formula be such that it will prevent the color-formers from migrating from one layer to another, otherwise color distortion will result upon color-forming development. Several methods have been proposed to prevent migration of color-formers from silver-halide emulsion layers by rendering such color-formers "fast to diffusion in gelatin". This result may be accomplished in several ways, as for example, by substituting the R group with suitable groups which impart substantive characteristics to the color-formers which combine permanently with the gelatin and other colloidal materials of the silver-halide emulsion, or by enlarging the substituent group of the color-former with a long chain alkyl radical so that the color-former is incapable of diffusing from the gelatin or other colloidal material. Examples of such methods which render color-formers fast to diffusion by imparting substantive characteristics thereto are disclosed in United States Patent 2,179,228. Examples of color-formers which are rendered fast to diffusion by enlarging the substituent group are disclosed in United States Patents 2,178,612; 2,179,244; 2,179,234; 2,179,238-9; 2,179,344; 2,186,045; 2,186,719; 2,186,732-3-4; 2,186,849; 2,186,851-2; 2,200,306; 2,280,722; 2,292,575; 2,303,928 and 2,307,399. By reference to the latter patents, it will be noted that the color-formers are modified by the inclusion of radicals of resins, polypeptides, hydrogenated ring systems, carbohydrates, long alkyl chains, and by having the substituent radical recur a number of times in the final molecule. It is to be understood that the substituent group of the color-formers of the present invention, in addition to those previously mentioned, include substantive groups or molecular enlarging groups for the purpose of rendering the 2,5-diketo-7-methyl-pyrimidopyrazoles fast to diffusion.

As examples of suitable aromatic primary amino developing agents which may be employed with the color coupling compounds of the present invention, there may be mentioned p-phenylene diamine, mono ethyl-p-phenylene diamine, di-ethyl-o-phenylene diamine, 4,4'-diamin-diphenylamine, p-amino-dialkyl aniline, e. g., p-amino-dimethyl aniline and p-amino-diethyl aniline. These developing agents are preferably used in the form of their salts such as the hydrochloride, since they are more soluble and stable than the free base. They are characterized by the presence of a free or primary amino group in the phenyl nucleus which enables the oxidation product of the developer to couple with the color-former to form a dye image in the emulsion adjacent to the individual particles of the silver image. The silver image may be removed by bleaching in the well-known manner to leave the color image in the emulsion.

A suitable developing solution is prepared as follows:

| | | |
|---|---|---|
| p-Amino-diethylaniline HCl | grams | 2.0 |
| Sodium carbonate (anhydrous) | do | 50.0 |
| Sodium sulfite (anhydrous) | do | 2.0 |
| Potassium bromide | do | 0.2 |
| Water to make | liters | 1 |

The exposed silver-halide emulsions are developed in the above solution in the usual manner. A solution or suspension of the color-former is only added to the developing solution where the color former is not present in the silver-halide emulsion.

The following examples are intended to illustrate the preparation of compounds disclosed above. It will be appreciated that the conditions of reactions, e. g., proportion of reacting ingredients, time of reaction, and temperature, may be varied and that supplementary processes of purification and the like may be resorted to wherever found desirable. These and other variations and modifications will be evident to those skilled in the art in light of the guiding principles disclosed herein.

*Example I*

1-phenyl-2,5-diketo-7-methyl-pyrimidopyrazoles

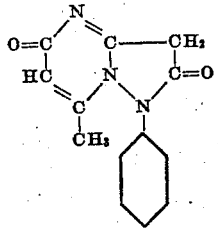

To 4 grams of 1-phenyl-3-amino-5-pyrazolone in 25 cc. of dry xylene, a solution of 3 grams of diketene in 10 cc. of dry xylene was added slowly with constant stirring. The mixture was stirred at room temperature for one-half hour and then heated on a steam bath at 100° C. for 2 hours. The reaction mixture was allowed to cool, the precipitated product filtered and washed several times with ether, and recrystallized from methyl alcohol.

One gram of the above product was dissolved in 20 cc. of ethyl alcohol. Two cc. of the solution was then added to the developing solution and used for the development of an exposed silver-halide emulsion. An excellent blue image was obtained together with the silver image.

*Example II*

1-(p-tolyl)-2,5-diketo-7-methyl-pyrimidopyrazole

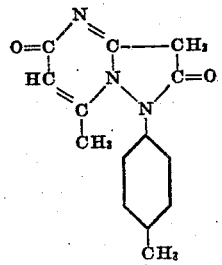

To 4.5 grams of 1-(p-tolyl)-3-amino-5-pyrazolone in 35 cc. of dry xylene, a solution of 4 grams of diketene in 15 cc. of dry xylene was added. The mixture was stirred at room temperature for 45 minutes and then heated on a steam bath at 100° C. for 2½ hours. The reaction mixture was allowed to cool, the precipitated product filtered and washed several times with ether, and recrystallized from methyl alcohol.

One gram of the above product was dissolved in 20 cc. of ethyl alcohol. Two cc. of the solution was then added to the developing solution and used for the development of an exposed silver-halide emulsion. An excellent blue image was obtained together with the silver image.

*Example III*

1-(α-quinolyl)-2,5-diketo-7-methyl-pyrimidopyrazole

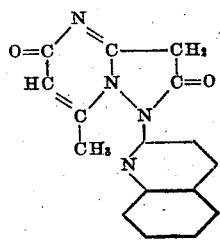

To 11.3 grams of 1-(α-quinolyl)-3-amino-5-pyrazolone in 75 cc. of dry xylene, a solution of 5.2 grams of diketene in 20 cc. of dry xylene was added. The mixture was stirred at room temperature for 45 minutes and then heated on a steam bath at 100° C. for 2½ hours. The reaction mixture was allowed to cool, the precipitated product filtered and washed several times with ether, and recrystallized from methyl alcohol.

One gram of the above color-former was dissolved in 2.0 cc. of 1 N-alcoholic KOH and added with thorough mixing to 100 cc. of a gelatin silver bromide-iodide emulsion. After coating the emulsion containing the color former onto a suitable support and drying, the film was exposed and developed to yield a blue image together with the silver image.

This application is a continuation-in-part of my co-pending application Serial No. 563,974, filed on November 17, 1944.

While I have disclosed the preferred embodiments of my invention and the preferred modes of carrying the same into effect, it will be readily apparent to those skilled in the art that many variations may be made therein without depart-

I claim:

1. A color forming photographic developer comprising an aromatic primary amino developing agent and a coupler compound having the general formula:

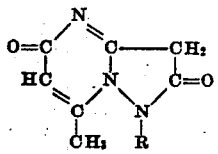

wherein R is selected from the class consisting of alkyl, aryl, aralkyl and heterocyclic groups.

2. A color forming photographic developer comprising an aromatic primary amino developing agent and 1-phenyl-2,5-diketo-7-methyl-pyrimidopyrazole.

3. A color forming photographic developer comprising an aromatic primary amino developing agent and 1-(p-tolyl)-2,5-diketo-7-methyl-pyrimidopyrazole.

4. A color forming photographic developer comprising an aromatic primary amino developing agent and 1-(α-quinolyl)-2,5-diketo-7-methyl-pyrimidopyrazole.

5. The method of producing a blue color photographic image in a gelatino silver-halide emulsion layer which comprises exposing the layer and developing it with an aromatic primary amino developing agent in the presence of a coupler compound having the general formula:

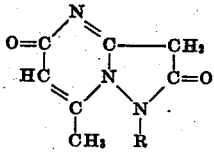

wherein R is selected from the class consisting of alkyl, aryl, aralkyl and heterocyclic groups.

6. The method of producing a blue color photographic image in a gelatino silver-halide emulsion layer which comprises exposing the layer and developing it with an aromatic primary amino developing agent containing 1-phenyl-2,5-diketo-7-methyl-pyrimidopyrazole.

7. The method of producing a blue color photographic image in a gelatino silver-halide emulsion layer which comprises exposing the layer and developing it with an aromatic primary amino developing agent containing 1-(p-tolyl)-2,5-diketo-7-methyl-pyrimidopyrazole.

8. The method of producing a blue color photographic image in a gelatino silver-halide emulsion layer which comprises exposing the layer and developing it with an aromatic primary amino developing agent containing 1-(α-quinolyl)-2,5-diketo-7-methyl-pyrimidopyrazole.

9. A photographic silver-halide emulsion containing a coupler compound having the general formula:

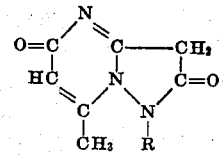

wherein R is selected from the class consisting of alkyl, aryl, aralkyl and heterocyclic groups.

10. A photographic silver-halide emulsion for forming color images comprising a colloidal carrier containing a sensitive silver-halide and 1-phenyl-2,5-diketo-7-methyl-pyrimidopyrazole.

11. A photographic silver-halide emulsion for forming color images comprising a colloidal carrier containing a sensitive silver-halide and 1-(p-tolyl)-2,5-diketo-7-methyl-pyrimidopyrazole.

12. A photographic silver-halide emulsion for forming color images comprising a colloidal carrier containing a sensitive silver-halide and 1-(α-quinolyl)-2,5-diketo-7-methyl-pyrimidopyrazole.

ABRAHAM BAVLEY.